United States Patent
Yamamoto et al.

(10) Patent No.: US 10,038,208 B2
(45) Date of Patent: Jul. 31, 2018

(54) FUEL CELL SYSTEM

(71) Applicant: TOYOTA JIDOSHA KABUSHIKI KAISHA, Toyota-shi, Aichi-ken (JP)

(72) Inventors: Kazuo Yamamoto, Toyota (JP); Hiroyuki Imanishi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 4 days.

(21) Appl. No.: 14/935,590

(22) Filed: Nov. 9, 2015

(65) Prior Publication Data

US 2016/0133975 A1    May 12, 2016

(30) Foreign Application Priority Data

Nov. 12, 2014  (JP) ................. 2014-230155
Sep. 4, 2015  (JP) ................. 2015-174965

(51) Int. Cl.
| | | |
|---|---|---|
| *H01M 8/06* | (2016.01) | |
| *H01M 8/04* | (2016.01) | |
| *H01M 8/0662* | (2016.01) | |
| *H01M 8/0438* | (2016.01) | |
| *H01M 8/04746* | (2016.01) | |

(52) U.S. Cl.
CPC ..... *H01M 8/0662* (2013.01); *H01M 8/04402* (2013.01); *H01M 8/04746* (2013.01); *H01M 8/04783* (2013.01)

(58) Field of Classification Search
CPC ........... H01M 8/0662; H01M 8/04582; H01M 8/0438; H01M 8/04432; H01M 8/04753
See application file for complete search history.

(56) References Cited

U.S. PATENT DOCUMENTS

| | | | |
|---|---|---|---|
| 2004/0229098 A1 | 11/2004 | Fujita | |
| 2005/0053814 A1 | 3/2005 | Imamura et al. | |
| 2007/0196709 A1* | 8/2007 | Umayahara | H01M 8/04164 |
| | | | 429/410 |

(Continued)

FOREIGN PATENT DOCUMENTS

| | | |
|---|---|---|
| DE | 102004023854 A1 | 12/2004 |
| EP | 1203418 B1 | 11/2009 |

(Continued)

OTHER PUBLICATIONS

US Patent and Trademark Office, Non-Final Office Action in U.S. Appl. No. 14/931,190 dated Jun. 5, 2017, 12 pages.

(Continued)

*Primary Examiner* — Osei K Amponsah
(74) *Attorney, Agent, or Firm* — Hunton Andrews Kurth LLP

(57) ABSTRACT

When a current value is not greater than a reference value, a control unit estimates a discharge amount of a fuel gas based on a lost amount of the fuel gas and a consumed amount by electrical generation of the fuel gas, the lost amount being calculated based on a decrease rate of pressure in a supply passage during an opening period of a discharge valve, the consumed amount by electrical generation being calculated based on the current value during the opening period, and when the current value is greater than the reference value, the control unit estimates the discharge amount based on the differential pressure during the opening period.

4 Claims, 13 Drawing Sheets

(56) References Cited

U.S. PATENT DOCUMENTS

| | | |
|---|---|---|
| 2009/0226783 A1 | 9/2009 | Hasegawa |
| 2010/0273081 A1 | 10/2010 | Ishikawa |
| 2013/0071767 A1 | 3/2013 | Katano |
| 2016/0133970 A1 | 5/2016 | Yamamoto et al. |
| 2016/0141659 A1 | 5/2016 | Yamamoto et al. |

FOREIGN PATENT DOCUMENTS

| | | | | |
|---|---|---|---|---|
| JP | 2005-166498 | * | 6/2005 | ............ H01M 8/04 |
| JP | 2005-166498 A | | 6/2005 | |
| JP | 2005-302708 A | | 10/2005 | |
| JP | 2005-339847 | * | 12/2005 | ............ H01M 8/04 |
| JP | 2007-172971 A | | 7/2007 | |
| JP | 2007-305563 A | | 11/2007 | |
| JP | 2007-311304 A | | 11/2007 | |
| JP | 2008-103167 A | | 5/2008 | |
| JP | 2009-146618 A | | 7/2009 | |
| JP | 2011-003507 A | | 1/2011 | |
| JP | 2011-138790 A | | 7/2011 | |
| JP | 2013-191369 A | | 9/2013 | |
| JP | 2014-102948 A | | 6/2014 | |
| KR | 2006-0124771 A | | 12/2006 | |

OTHER PUBLICATIONS

US Patent and Trademark Office, Office Action in U.S. Appl. No. 14/938,189, dated May 23, 2017, 14 pages.
Office Action dated Nov. 20, 2017, in related U.S. Appl. No. 14/938,189.
Office Action dated Nov. 21, 2017, in related U.S. Appl. No. 14/931,190, 13 pages.
Notice of Allowance dated Feb. 8, 2018, in related U.S. Appl. No. 14/938,189, 17 pages.
Notice of Allowance dated Mar. 27, 2018, in related U.S. Appl. No. 14/931,190, 10 pages.

* cited by examiner

FUEL CELL SYSTEM

CROSS-REFERENCE TO RELATED APPLICATION

This application is based upon and claims the benefit of priority of the prior Japanese Patent Application No. 2014-230155, filed on Nov. 12, 2014, and the prior Japanese Patent Application No. 2015-174965, filed on Sep. 4, 2015, the entire contents of which are incorporated herein by reference.

FIELD OF THE INVENTION

The present invention relates to a fuel cell system.

BACKGROUND

There is known a fuel cell system that includes: a gas-liquid separator storing and separating water from a fuel gas discharged from a fuel cell; and a discharge valve connected to the gas-liquid separator and discharging the fuel gas to the outside together with the stored water in the gas-liquid separator. For example, Japanese Unexamined Patent Application Publication No. 2005-302708 describes technology for estimating a discharge amount of the fuel gas by opening the discharge valve.

The discharge amount of the fuel gas is estimated conceivably based on, for example, a differential pressure between upstream and downstream sides of the discharge valve during the period when the discharge valve is opened. However, the inventors found that the estimation of the discharge amount of the fuel gas by the above method might generate a large error between the estimated discharge amount and the actual discharge amount.

SUMMARY OF THE INVENTION

It is therefore an object of the present invention to provide a fuel cell system that suppresses deterioration in estimation accuracy of a discharge amount of a fuel gas in a large load region of a fuel cell.

According to an aspect of the present invention, a fuel cell system includes: a fuel cell; a fuel supply source that supplies a fuel gas to the fuel cell; a supply passage through which the fuel gas supplied from the fuel supply source flows to the fuel cell; a circulation passage through which the fuel gas partially discharged from the fuel cell flows to the supply passage; a gas-liquid separator that is arranged in the circulation passage and that stores and separates water from the fuel gas partially discharged from the fuel cell; a discharge passage that is connected to the gas-liquid separator, discharges stored water in the gas-liquid separator to an outside, and partially discharges the fuel gas partially discharged from the fuel cell to the outside; a discharge valve that is arranged in the discharge passage; a current detecting portion that detects a current value of the fuel cell; a pressure detecting portion that detects pressure in the supply passage; a differential pressure detecting portion that detects a difference in pressure between a downstream side of the discharge valve and one of the supply passage, the circulation passage, the gas-liquid separator, and an upstream side of the discharge valve in the discharge passage; and a control unit that estimates a discharge amount of the fuel gas partially discharged from the fuel cell partially discharged by opening the discharge valve, wherein when the current value is not greater than a reference value, the control unit estimates the discharge amount based on a lost amount of the fuel gas and a consumed amount by electrical generation of the fuel gas, the lost amount being calculated based on a decrease rate of pressure in the supply passage during an opening period of the discharge valve, the consumed amount by electrical generation being calculated based on the current value during the opening period, and when the current value is greater than the reference value, the control unit estimates the discharge amount based on the differential pressure during the opening period.

When the current value is not greater than the reference value, the control unit may estimate the discharge amount based on a value obtained by subtracting the consumed amount from the lost amount.

According to another aspect of the present invention, a fuel cell system includes: a fuel cell; a fuel supply source that supplies a fuel gas to the fuel cell; a supply passage through which the fuel gas supplied from the fuel supply source flows to the fuel cell; a circulation passage through which the fuel gas partially discharged from the fuel cell flows to the supply passage; a gas-liquid separator that is arranged in the circulation passage and that stores and separates water from the fuel gas partially discharged from the fuel cell; a discharge passage that is connected to the gas-liquid separator, discharges stored water in the gas-liquid separator to an outside, and partially discharges the fuel gas partially discharged from the fuel cell to the outside; a discharge valve that is arranged in the discharge passage; a current detecting portion that detects a current value of the fuel cell; a pressure detecting portion that detects pressure in one of the circulation passage and the gas-liquid separator; a differential pressure detecting portion that detects a difference in pressure between a downstream side of the discharge valve and one of the supply passage, the circulation passage, the gas-liquid separator, and an upstream side of the discharge valve in the discharge passage; and a control unit that estimates a discharge amount of the fuel gas partially discharged from the fuel cell partially discharged by opening the discharge valve, wherein when the current value is not greater than a reference value, the control unit estimates the discharge amount gas based on a lost amount of the fuel gas and a consumed amount by electrical generation of the fuel gas, the lost amount being calculated based on a decrease rate of pressure in the one of the circulation passage and the gas-liquid separator during an opening period of the discharge valve, the consumed amount by electrical generation being calculated based on the current value during the opening period, and when the current value is greater than the reference value, the control unit estimates the discharge amount based on the differential pressure during the opening period.

According to still another aspect of the present invention, a fuel cell system includes: a fuel cell; a fuel supply source that supplies a fuel gas to the fuel cell; a supply passage through which the fuel gas supplied from the fuel supply source flows to the fuel cell; a gas-liquid separator that stores and separates water from the fuel gas partially discharged from the fuel cell; a first discharge passage through which the fuel gas partially discharged from the fuel cell flows to the gas-liquid separator; a second discharge passage that is connected to the gas-liquid separator, discharges stored water in the gas-liquid separator to an outside, and discharges the fuel gas partially discharged from the fuel cell to the outside; a discharge valve that is arranged in the second discharge passage; a current detecting portion that detects a current value of the fuel cell; a pressure detecting portion that detects pressure in one of the supply passage, the first discharge passage, and the gas-liquid separator; a differential pressure detecting portion that detects a difference in pressure between a downstream side of the discharge valve and one of the supply passage, the first discharge passage, the gas-liquid separator, and an upstream side of the discharge valve in the second discharge passage; and a control unit that estimates a discharge amount of the fuel gas partially discharged from the fuel cell partially discharged by opening the discharge valve, wherein the fuel cell system is an anode non-circulation type in which the fuel gas discharged from the fuel cell does not return to the supply passage, when the current value is not greater than a reference value, the control unit estimates the discharge amount based on a lost amount of the fuel gas and a consumed amount by electrical generation of the fuel gas, the lost amount being calculated based on a decrease rate of pressure in the one of the supply passage, the first discharge passage, and the gas-liquid separator during an opening period of the discharge valve, the consumed amount by electrical generation being calculated based on the current value during the opening period, and when the current value is greater than the reference value, the control unit estimates the discharge amount based on the differential pressure during the opening period.

DETAILED DESCRIPTION

Figure 1:
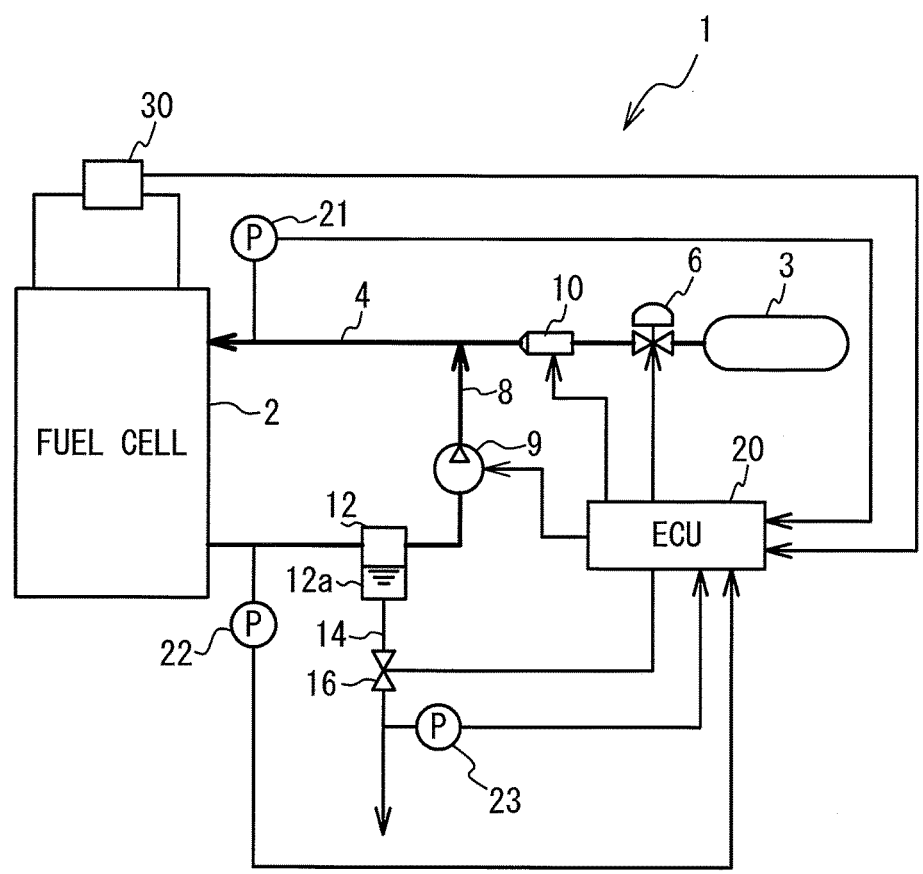
FIG. 1 is a schematic view of a fuel cell system.

A fuel cell system 1 (referred to as system) according to the present embodiment will be described with reference to drawings. The system 1 can be applied to a system installed in a vehicle. However, the system 1 may be applied to another system. FIG. 1 is a schematic view of the system 1. The system 1 includes a fuel cell 2 as a power supply. In the fuel cell 2, a electrolyte film such as a solid polymer electrolyte membrane is sandwiched between an anode and a cathode of catalyst electrodes (the electrolyte film, the anode, and the cathode are not illustrated). The anode is supplied with a fuel gas containing hydrogen, and the cathode is supplied with a oxidizing gas containing oxygen such air, which generates electricity.

A tank 3 is a fuel supply source supplying the fuel gas to the fuel cell 2. An anode inlet of the fuel cell 2 is connected to a supply passage 4 through which the fuel gas supplied from the tank 3 flows to the fuel cell 2. A regulating valve 6 is arranged in the supply passage 4. The regulating valve 6 reduces the pressure of the fuel gas supplied from the tank 3 to be a predetermined pressure, and then the fuel gas is supplied to the fuel cell 2. Also, an injector 10 is arranged on the downstream side of the regulating valve 6 in the supply passage 4. The injector 10 is an electromagnetic on-off valve. As for the on-off valve, a valve body is directly driven away from a valve seat by the electromagnetic driving force in a predetermined period, thereby regulating a gas flow rate and a gas pressure. The injector 10 and the regulating valve 6 are controlled by an ECU (Electronic Control Unit) 20.

An anode outlet of the fuel cell 2 is connected to a circulation passage 8 through which the fuel gas (a fuel off-gas) partially discharged from the fuel cell 2 flows to the supply passage 4. Specifically, the downstream end of the circulation passage 8 is connected to the supply passage 4. Also, the circulation passage 8 is provided with a circulation pump 9 for pressurizing and supplying the fuel gas partially discharged from the fuel cell 2 to the supply passage 4. Therefore, in this system 1, the fuel gas circulates through the supply passage 4 and the circulation passage 8 during operation of the fuel cell 2.

A part of the circulation passage 8 is provided with a gas-liquid separator 12 that separates water from the fuel gas and has a storage tank 12a for storing the separated water. In the system 1, water generated by the electric generation of the fuel cell 2 leaks through the electrolyte membrane from the cathode side to the anode side. The water moved to the anode side is discharged together with the fuel gas to the circulation passage 8, and then is stored in the gas-liquid separator 12.

A bottom portion of the storage tank 12a of the gas-liquid separator 12 is connected to a discharge passage 14 that partially discharges the fuel gas partially discharged from the fuel cell 2 and discharges the stored water in the gas-liquid separator 12 to the outside. The downstream end of the discharge passage 14 is exposed to the outside air. A discharge valve 16 is arranged in the discharge passage 14. The discharge valve 16 is usually closed, but is opened by the ECU 20 as needed. A shut-off valve or a flow rate regulating valve that controls the discharge state may be employed as the discharge valve 16. In this embodiment, the discharge valve 16 is a shut-off valve. The discharge valve 16 is opened to discharge the water before the stored water overflows from the storage tank 12a, which can prevent the water from being supplied to the fuel cell 2 through the circulation passage 8 and the supply passage 4.

A pressure sensor 21 that detects the pressure in the supply passage 4 is provided on the downstream side of the injector 10 in the supply passage 4. The pressure sensor 21 basically detects the pressure of the fuel gas to be supplied to the fuel cell 2. A pressure sensor 22 that detects the pressure in the circulation passage 8 is provided on the upstream side of the gas-liquid separator 12 in the circulation passage 8. The pressure sensor 22 basically detects the pressure of the fuel gas partially discharged from the fuel cell 2 and detects the pressure in the upstream side of the discharge valve 16. A pressure sensor 23 that detects the pressure in the downstream side of the discharge valve 16 in the discharge passage 14 is provided therein and that detects the pressure in the downstream side of the discharge valve 16. A detection value of the pressure sensor 23 indicates generally atmospheric pressure. The pressure sensors 21 to 23 are connected to the input side of the ECU 20, and output signals corresponding to the detected pressure to the ECU 20. The pressure sensor 21 is an example of a pressure detecting portion that detects the pressure in the supply passage 4. The pressure sensors 22 and 23 are an example of a differential pressure detecting portion that detects a difference in pressure between the downstream side of the discharge valve 16 and one of the supply passage 4, the circulation passage 8, the gas-liquid separator 12, and the upstream side of the discharge valve 16 in the discharge passage 14.

A load device 30 is connected to the fuel cell 2. The load device 30 measures an electric characteristic of the fuel cell 2 and uses, for example, a potentio-galvanostat of a versatile electrochemical type. The load device 30 is electrically connected to an anode side separator and a cathode side separator of the fuel cell 2 through wirings. The load device 30 measures a current flowing through the fuel cell 2 at the time of electrical generation thereof and a load voltage (cell voltage) of the fuel cell 2. The load device 30 is an example of a current detecting portion detecting a current value.

The ECU 20 includes a microcomputer including a CPU (Central Processing Unit), a ROM (Read Only Memory), and a RAM (Random Access Memory). The ECU 20 is electrically connected to each component of the system 1 and controls operation of each component on the basis of information sent therefrom. Also, the ECU 20 is an example of a control unit that executes control for estimating a discharge amount of the fuel gas described later in detail.

Additionally, a passage for supplying oxidation gas is connected to the cathode inlet of the fuel cell 2, and a passage for discharging an oxidation off-gas is connected to the cathode outlet, but they are omitted in FIG. 1.

As mentioned above, the opening of the discharge valve 16 permits the discharge of the stored water from the gas-liquid separator 12 to the outside. At this time, the fuel gas is partially discharged together with the stored water to the outside. It is desirable herein that the actual discharge amount of the fuel gas partially discharged from the discharge valve 16 is controlled to be the same as the target gas discharge amount. This is because, if the actual gas discharge amount is much larger than the target gas discharge amount, the fuel gas might be wasted and the fuel consumption might be degraded. In contrast, if the actual gas discharge amount is much smaller than the target gas discharge amount, for example, if the actual gas discharge amount is zero, the stored water might not be sufficiently discharged. Thus, this system 1 estimates the discharge amount of the fuel gas partially discharged from the fuel cell 2 partially discharged during the opening of the discharge valve 16, and closes the discharge valve 16 when the estimated gas discharge amount reaches the target gas discharge amount.

Figure 2:
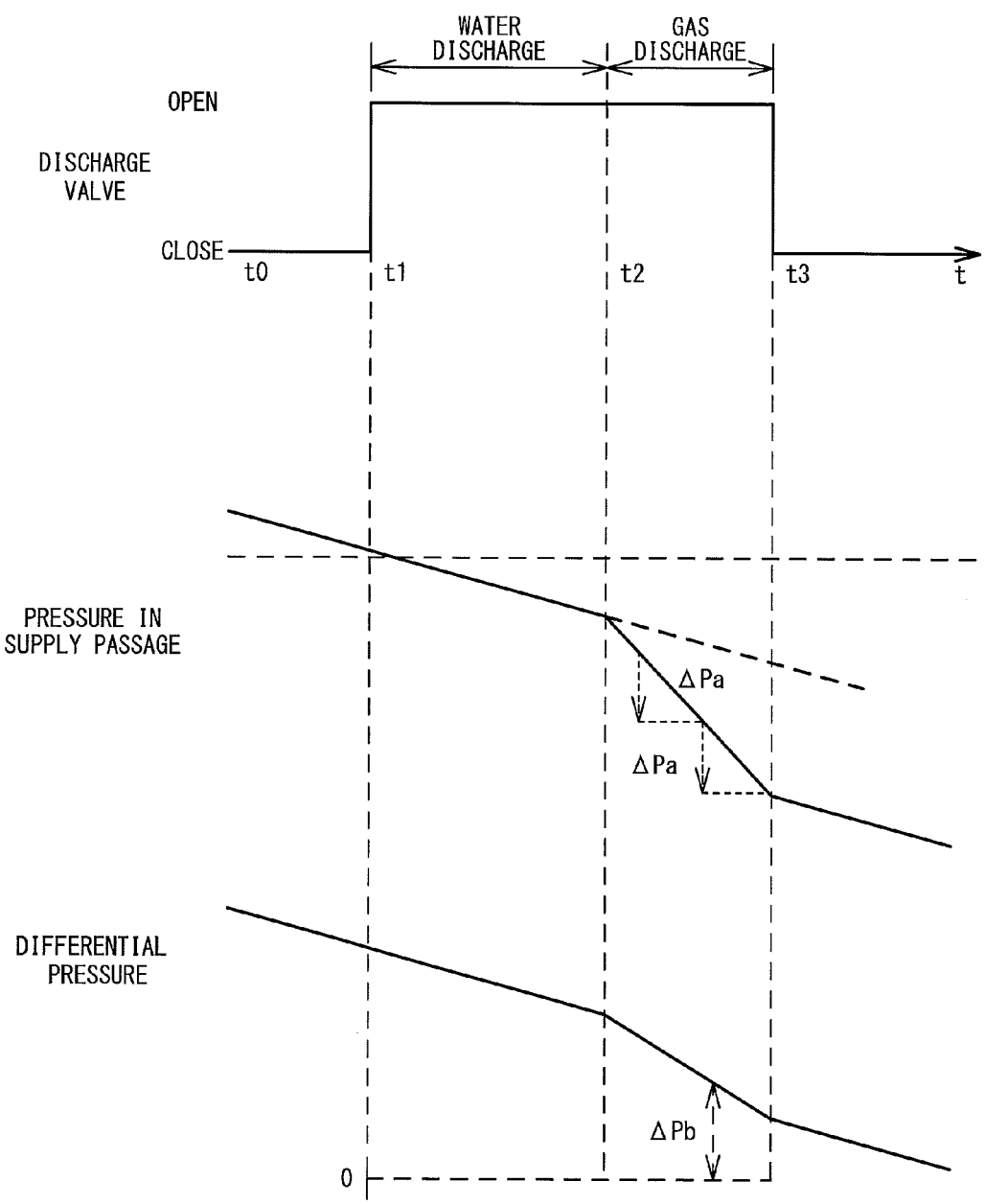
FIG. 2 is a timing chart indicating operation of a discharge valve, a change in pressure in a supply passage, and a change in difference in pressure between a circulation passage and a downstream side of a discharge valve in a discharge passage.

Next, a description will be given of a change in pressure by operation of the discharge valve 16. FIG. 2 is a timing chart indicating the operation of the discharge valve 16, a change in pressure in the supply passage 4, and a change in the difference in pressure between the circulation passage 8 and the downstream side of the discharge valve 16 in the discharge passage 14. Additionally, FIG. 2 is a timing chart in the state where the fuel gas is not supplied from the injector 10. As mentioned above, the pressure in the supply passage 4 is detected by the pressure sensor 21. The difference in pressure between the circulation passage 8 and the downstream side of the discharge valve 16 in the discharge passage 14 (hereinafter referred to as differential pressure) is detected based on the output values from the pressure sensors 22 and 23. In FIG. 2, the discharge valve 16 is closed at time t0, the discharge valve 16 is opened at time t1, the discharge of the stored water from the gas-liquid is completed from time t1 to time t2, and the fuel gas is partially discharged from time t2 to time t3.

As illustrated in FIG. 2, before the discharge valve 16 is opened, the pressure in the supply passage 4 slightly decreases. Just after the discharge valve 16 is opened, the pressure in the supply passage 4 does not immediately change. The pressure drastically decreases some time after the discharge valve 16 is opened. The pressure in the supply passage 4 decreases from time t0 when the discharge valve 16 is closed to time t2 when the discharge of the stored water is completed. This decrease in pressure results from the consumption of the fuel gas by the electrical generation of the fuel cell 2. A decrease in differential pressure also decreases from time t0 to time t2 for the same reason. Further, the pressure in the supply passage 4 from time t1 to time t2 does not substantially change, as compared with the pressure in the supply passage 4 from time t0 to time t1. This is because the stored water is discharged from time t1 to time t2, but the fuel gas is not discharged.

When the discharge of the stored water is completed and the gas-liquid separator 12 and the discharge passage 14 communicate with the atmosphere, the fuel gas is partially discharged through the discharge passage 14. Thus, the pressure in the supply passage 4 and the differential pressure decrease from time t2 to time t3. This is because the discharge of the fuel gas decreases the pressure in the supply passage 4 that communicates with the circulation passage 8. Thus, the decrease in pressure in the supply passage 4 from time t2 to time t3 results from the consumption of the fuel gas by the electrical generation of the fuel cell 2 and the discharge amount of the fuel gas. Also, the differential pressure decreases from time t2 to time t3. This is because the discharge of the fuel gas decreases the pressure in the circulation passage 8 detected by the pressure sensor 22, but the atmospheric pressure detected by the pressure sensor 23 does not almost change. Also, when it is determined that the estimated gas discharge amount by the estimation method to be described later reaches the target gas discharge amount, the discharge valve 16 is closed.

Figure 3:
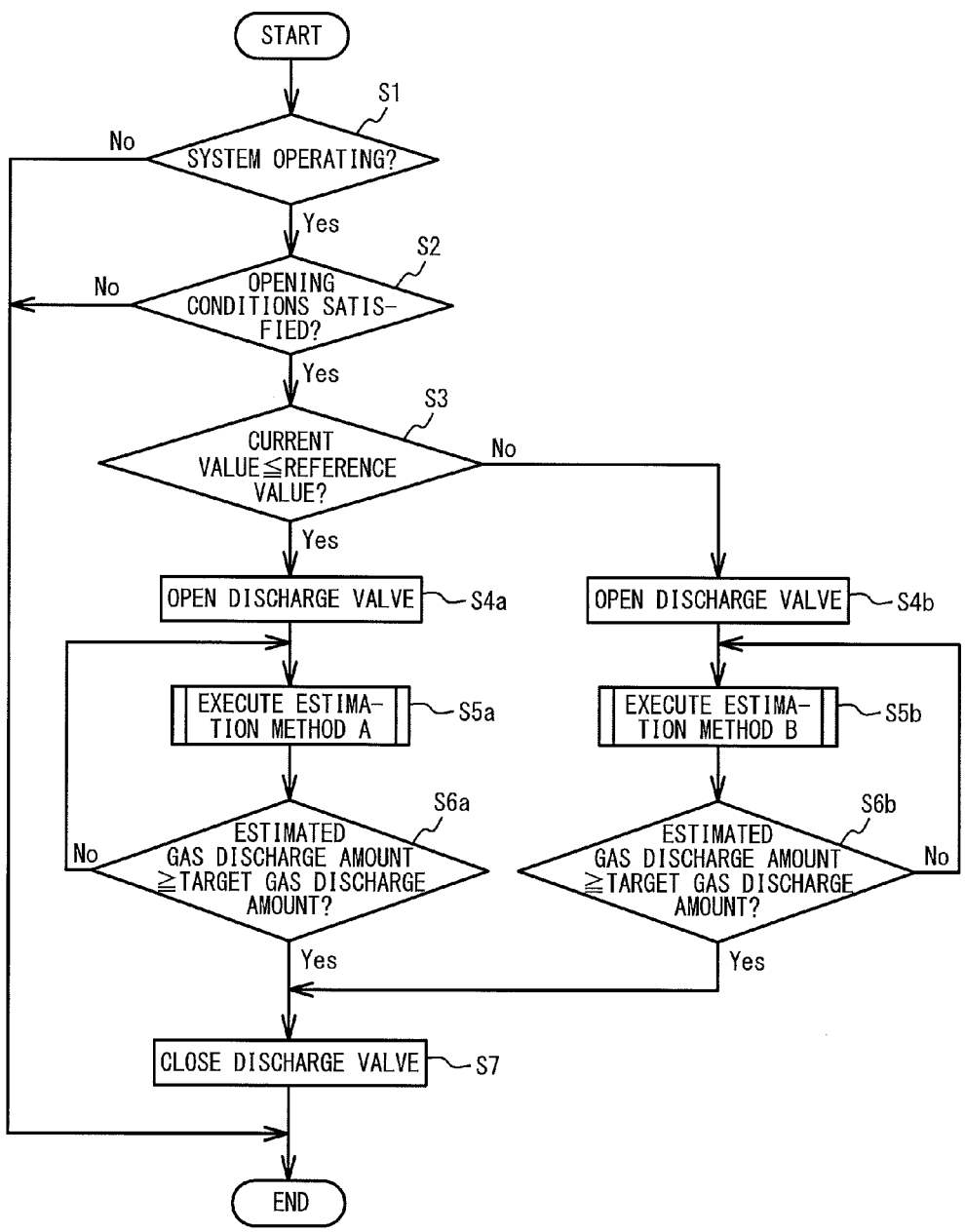
FIG. 3 is a flowchart of opening and closing control for the discharge valve executed by an ECU.

FIG. 3 is a flowchart of the opening and closing control for the discharge valve 16 executed by the ECU 20. The ECU 20 determines whether or not the system 1 is operated (step S1). This is because the discharge process of the stored water is executed when the system 1 is operated. When the system 1 is operated, the ECU 20 executes processes after step 1. When the system 1 is not operated, this control is finished.

Next, the ECU 20 determines whether or not open conditions of the discharge valve 16 are satisfied (step S2). The open conditions are, for example, when a predetermined period elapses from the time when the discharge valve 16 is opened last, but the present invention is not limited to this. When the open conditions are not satisfied, this control is finished. When the open conditions of the discharge valve 16 are satisfied, the ECU 20 determines whether or not the current value of the fuel cell 2 detected by the load device 30 is not greater than a reference value (step S3). The reference value will be described later in detail. When the current value is not greater than the reference value, the ECU 20 opens the discharge valve 16 (step S4a) and executes the estimation method A for estimating the discharge amount of the fuel gas due to the opening of the discharge valve 16 (step S5a). The ECU 20 determines whether or not the estimated gas discharge amount is not less than the target gas discharge amount (step S6a) and continues estimating the gas discharge amount until the estimated gas discharge amount is not less than the target gas discharge amount. When the estimated gas discharge amount is not less than the target gas discharge amount, the ECU 20 closes the discharge valve 16 (step S7), and this control is finished. Additionally, the target gas discharge amount may be a preset fixed value or a value set in response to the operation state of the system 1.

In contrast, when a negative determination is made in step S3, that is, when the current value is greater than the reference value, the ECU 20 opens the discharge valve 16 (step S4b) and executes the estimation method B for estimating the discharge amount of the fuel gas due to the opening of the discharge valve 16 (step S5b). The ECU 20 determines whether or not the estimated gas discharge amount is not less than the target gas discharge amount (step S6b) and continues estimating the discharge gas amount until the estimated gas discharge amount is not less than the target gas discharge amount. When the estimated gas discharge amount is not less than the target gas discharge amount, the ECU 20 closes the discharge valve 16 (step S7) and this control is finished. The above control discharges the stored water in the gas-liquid separator 12 and the desired amount of the fuel gas.

Figure 4:
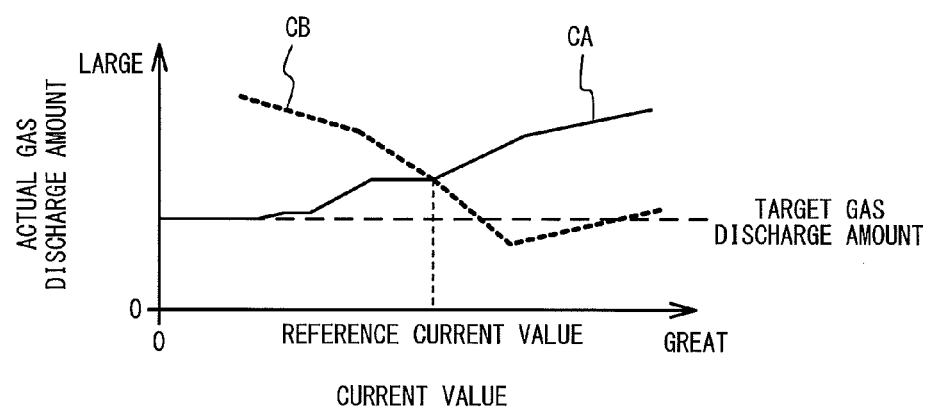
FIG. 4 is a graph of experimental results indicating actual gas discharge amounts in a case where gas discharge amounts respectively estimated by estimation methods A and B are controlled to be equal to a target gas discharge amount.

Next, a description will be given of the reason for switching between the estimation methods A and B depending on the current value. FIG. 4 is a graph of experimental results indicating actual gas discharge amounts in a case where gas discharge amounts respectively estimated by estimation methods A and B are controlled to be equal to a target gas discharge amount. The vertical axis of the graph indicates the gas discharge amount. The horizontal axis indicates the current value. Lines CA and CB indicate the actual gas discharge amounts in the case where the gas discharge amount is estimated by the estimation methods A and B under the conditions under which the current value is different and the target gas discharge amount is constant. Thus, FIG. 4 indicates errors between the estimated gas discharge amount and the actual gas discharge amount.

As indicated by the line CA, in the region where the current value is small, there are small errors between the target gas discharge amount, that is, the estimated gas discharge amount and the actual gas discharge amount. However, there are large errors in the region where the current value is great. In contrast, as indicated by the line CB, there are large errors in the region where the current value is small, whereas there are small errors in the region where the current value is great. This system 1 employs a current value in the vicinity of the intersection point of the lines CA and CB as the reference value. Therefore, as mentioned above, the gas discharge amount is estimated by the estimation method A that has small errors in the region where the current value is not greater than the reference value. The gas discharge amount is estimated by the estimation method B that has small errors in the region where the current value is greater than the reference value.

Figure 5:
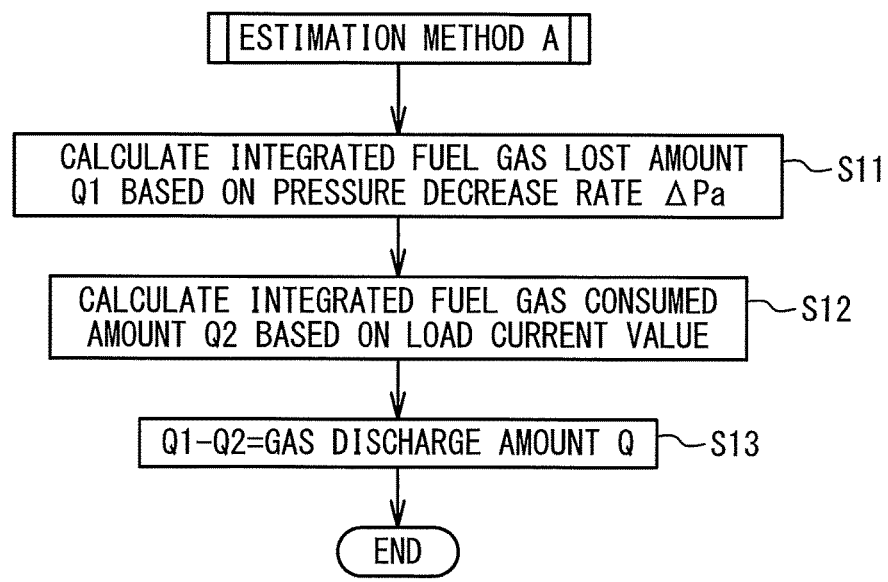
FIG. 5 is a flowchart of gas discharge amount estimation control by the estimation method A.
Figure 6:
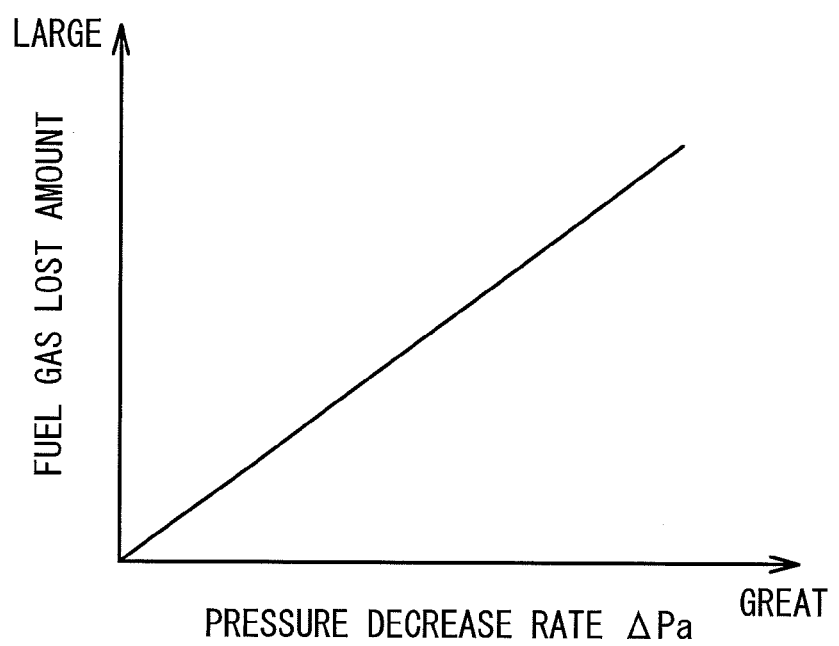
FIG. 6 is a map that defines a relationship between a pressure decrease rate and a fuel gas lost amount per unit time.

Next, the estimation method A will be described with reference to FIGS. 2 and 5. FIG. 5 is a flowchart of the gas discharge amount estimation control by the estimation method A. The estimation method A estimates the discharge amount of the fuel gas on the basis of the lost amount of the fuel gas and the consumed amount of the fuel gas. The lost amount is calculated based on the decrease rate of the pressure in the supply passage 4 during an opening period when the discharge valve 16 is opened. The consumed amount of the fuel gas by the power generation of the fuel cell 2 is calculated based on the current value of the fuel cell 2 during the opening period. The ECU 20 calculates an integrated fuel gas lost amount Q1 based on the decrease rate ΔPa of the pressure in the supply passage 4 from time t1 when the discharge valve 16 is opened (step S11). FIG. 6 is a map that defines the relationship between the pressure decrease rate ΔPa and the fuel gas lost amount per unit time. The ECU 20 calculates the fuel gas lost amount per unit time in the pressure decrease rate ΔPa on the basis of the map, integrates the amount from time t1 to the present time, and calculates the integrated fuel gas lost amount Q1. Additionally, the fuel gas lost amount per unit time may be calculated based on calculation expression using the pressure decrease rate ΔPa. Also, the ECU 20 calculates the value, obtained by subtracting the present pressure value from the last pressure value detected by the pressure sensor 21, as the pressure decrease rate ΔP.

Figure 7:
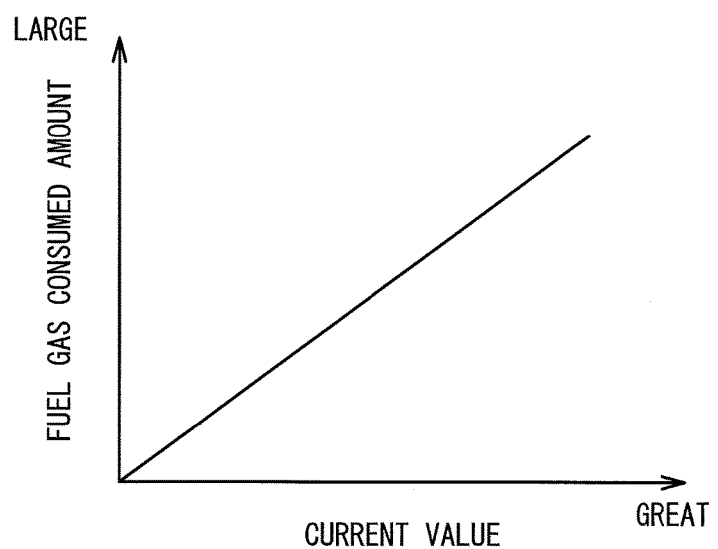
FIG. 7 is a map that defines a relationship between a current value and a fuel gas consumed amount per unit time.

Next, the ECU 20 calculates the integrated fuel gas consumed amount Q2 due to the electrical generation of the fuel cell 2, on the basis of the current value (step S12). FIG. 7 is a map that defines the relationship between the current value and the fuel gas consumed amount per unit time. The ECU 20 calculates the fuel gas consumed amount, corresponding to the current value, per unit time on the basis of the map, integrates the amount from time t1 to the present time, and calculates the integrated fuel gas consumed amount Q2. Additionally, the maps illustrated in FIGS. 6 and 7 are defined through experiments beforehand and stored in the ROM of the ECU 20. Additionally, the fuel gas consumed amount per unit time may be calculated by calculation expression using the current value.

Figure 8:
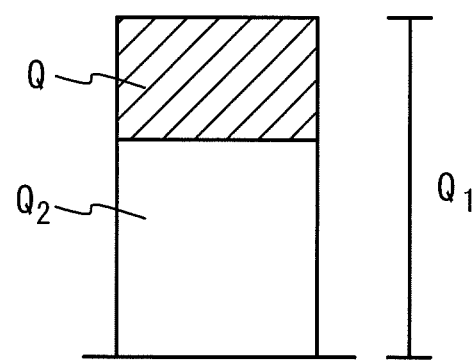
FIG. 8 is a view illustrating a relationship among an integrated fuel gas lost amount Q1, an integrated fuel gas consumption Q2, and an estimated discharge amount Q of the fuel gas.

The integrated fuel gas consumed amount Q2 to be mentioned above herein indicates the total amount of the fuel gas used by the electrical generation of the fuel cell 2. The integrated fuel gas lost amount Q1 indicates the total amount of the fuel gas that is lost from the supply passage 4, the circulation passage 8, and the fuel cell 2 regardless of cause. Thus, the integrated fuel gas lost amount Q1 includes the integrated fuel gas consumed amount Q2 and the integrated discharge amount Q of the fuel gas by opening the discharge valve 16. FIG. 8 is a view illustrating the relationship among the integrated fuel gas lost amount Q1, the integrated fuel gas consumed amount Q2, and the estimated discharge amount Q of the fuel gas. Additionally, when the discharge of the stored water is not completed, the integrated fuel gas lost amount Q1 is substantially the same as the integrated fuel gas consumed amount Q2 consumed by the electrical generation. Thus, the discharge amount Q of the fuel gas is substantially zero.

Next, the ECU 20 calculated the estimated discharge amount Q, obtained by subtracting the integrated fuel gas consumed amount Q2 from the integrated fuel gas lost amount Q1, as the estimated gas discharge amount (step S13). The above steps S11 to S13 are executed repeatedly until the estimated discharge amount reaches the target gas discharge amount as illustrated in FIG. 3 (No in step S6a). When the estimated discharge amount reaches the target gas discharge amount (Yes in step S6a), the discharge valve 16 is closed (step S7). In the above way, the discharge amount is estimated. Additionally, a value obtained by multiplying a calibration coefficient by a value obtained by subtracting the integrated fuel gas consumed amount Q2 from the integrated fuel gas lost amount Q1 may be calculated as the estimated gas discharge amount.

Next, a description will be given of the reason why the estimation method A has large errors in the region where the current is high as illustrated in FIG. 4. In the estimation method A, when the current of the fuel cell 2 is high, that is, when the consumed amount of the fuel gas by the electrical generation of the fuel cell 2 is large, the decrease rate of the pressure in the supply passage 4 is great from time t1 to time t2 illustrated in FIG. 2. That is, the inclination of the line indicating the pressure in the supply passage 4 changes sharply. There is a possibility that the decrease rate of the pressure in the supply passage 4 due to the electrical generation is substantially the same as the decrease rate of the pressure in the supply passage 4 due to the discharge of the fuel gas. In this case, the integrated fuel gas lost amount Q1 and the integrated fuel gas consumed amount Q2 calculated by the above methods might be substantially the same, and the calculated discharge amount Q might be less than the actual gas discharge amount. Thus, after the actual gas discharge amount is larger than the target gas discharge amount, the discharge valve 16 might be closed. Conceivably, this causes large errors in the region of the great current value in the estimation method A.

Figure 9:
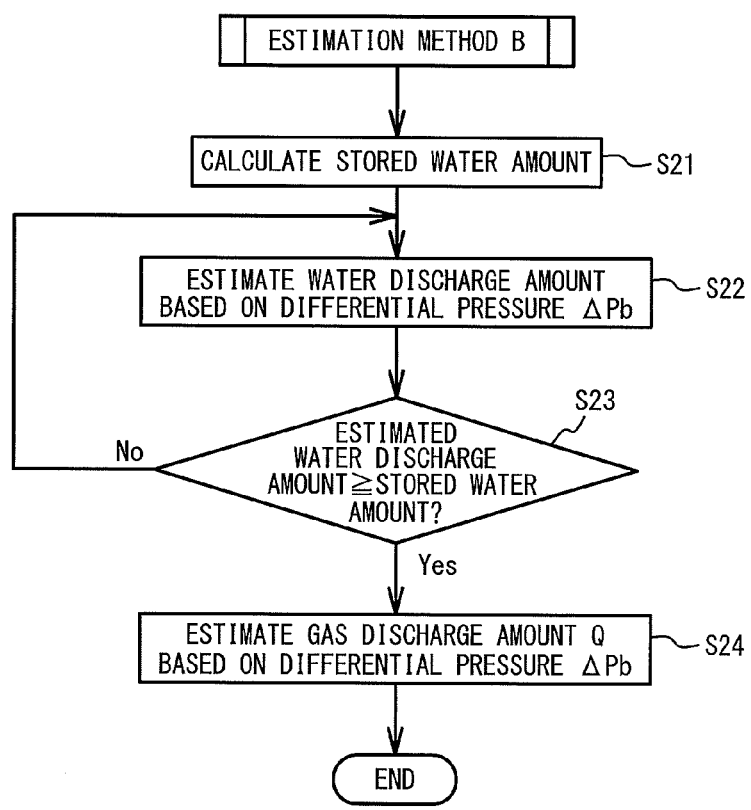
FIG. 9 is a flowchart of the gas discharge amount estimation control by a method B.

Next, the estimation method B will be described with reference to FIGS. 2 and 9. FIG. 9 is a flowchart of the gas discharge amount estimation control by the estimation method B. The estimation method B estimates the discharge amount of the fuel gas on the basis of the differential pressure during the opening period of the discharge valve 16.

Figure 10:
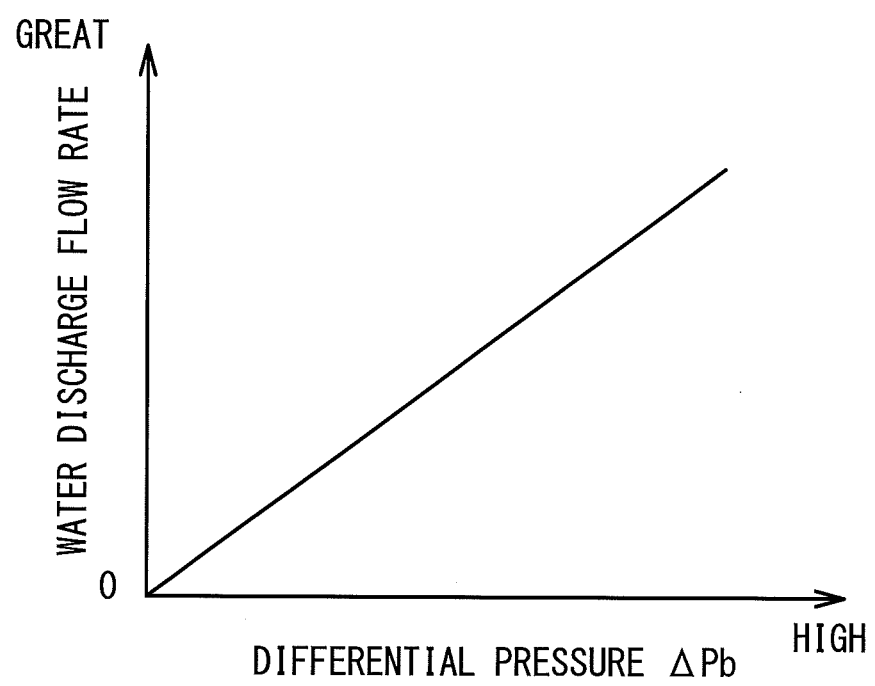
FIG. 10 is a map that defines a relationship between a differential pressure ΔPb and a water discharge flow amount.

The ECU 20 calculates the stored water amount in the gas-liquid separator 12 just before the discharge valve 16 is opened (step S21). Specifically, the ECU 20 calculates the stored water amount in the gas-liquid separator 12 by calculating the amount of water having been generated in response to the electrical generation of the fuel cell 2 from the time when the water is discharged last, on the basis of a relational expression, a map, or the like associating the generated water amount with the current of the fuel cell 2. The electrical generation amount of the fuel cell 2 is calculated based on the current. Next, the ECU 20 estimates the amount of the water having been discharged from the time when the discharge valve 16 is opened, on the basis of the differential pressure ΔPb between the circulation passage 8 and the downstream side of the discharge valve 16 (step S22). FIG. 10 is a map that defines the differential pressure ΔPb and the discharge water amount. The ECU 20 calculates the discharge water amount corresponding to the differential pressure ΔPb on the basis of this map, integrates the amount from time t1 when the discharge valve 16 is opened to the present time, and estimates the discharge water amount. Additionally, the map of FIG. 10 is defined through experiments beforehand and stored in the ROM of the ECU 20. The map of FIG. 10 indicates that the discharge water amount per unit time increases as the differential pressure ΔPb increases, that is, as the pressure in the circulation passage 8 increases in comparison to the pressure in the downstream side of the discharge valve 16. This is because the higher the differential pressure ΔPb is, the more the discharge of the water to the outside is promoted.

Next, the ECU 20 determines whether or not the estimated water discharge amount is not less than the calculated stored water amount (step S23). The ECU 20 continues estimating the discharge water amount until the estimated water discharge amount is not less than the stored water amount.

Figure 11:
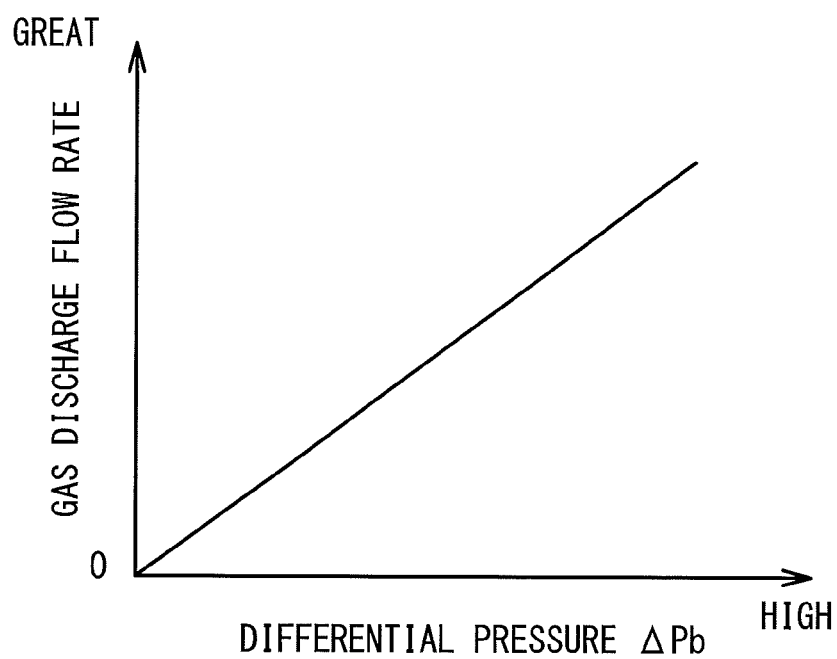
FIG. 11 is a map the defines the differential pressure ΔPb and a gas discharge flow amount.

When the estimated water discharge amount reaches the stored water amount, it is determined that the water discharge is completed, and the ECU 20 estimates the gas discharge amount based on the differential pressure ΔPb between the upstream side and the downstream side of the discharge valve 16 (step S24). FIG. 11 is a map that defines the relationship between the differential pressure ΔPb and the gas discharge flow amount. The ECU 20 calculates the discharge amount of the fuel gas corresponding to the differential pressure ΔPb on the basis of this map, integrates the amount from time t2 when the discharge of the stored water is completed to the present time, and calculates the gas discharge amount Q. Additionally, the map of FIG. 11 is defined through experiments beforehand and is stored in the ROM of the ECU 20. Like the map of FIG. 10, the map of FIG. 11 indicates that the gas discharge amount per unit increases as the differential pressure ΔPb increases. This is because the higher the differential pressure ΔPb is, the more the discharge of the gas is promoted. Additionally, without using the maps of FIGS. 10 and 11, the water discharge amount and the gas discharge amount may be estimated based on expressions using the differential pressure ΔPb.

The above steps S21 to S24 are executed repeatedly until the estimated gas discharge amount reaches the target gas discharge amount as illustrated in FIG. 3 (No in step S6b). When the estimated gas discharge amount reaches the target gas discharge amount (Yes in step S6b), the discharge valve 16 is closed (step S7). In the above way, the gas discharge amount is estimated.

As illustrated in FIG. 4, in the region where the current value is small, the error of the estimation method B is larger than that of the estimation method A for any reason. The reason for this is considered as follows. The pressure in the circulation passage 8 is smaller in the region of the small current value than in the region of the great current value. Thus, the differential pressure between the circulation passage 8 and the downstream side of the discharge valve 16 is also small. When the differential pressure decreases in such a way, the detected differential pressure ΔPb might be smaller than the actual differential pressure due to the detection error of the pressure sensors 22 and 23. Therefore, the gas discharge flow amount less than the actual discharge flow amount is calculated, so that the gas discharge amount less than the actual gas discharge amount is estimated. As a result, the actual gas discharge amount larger than the estimated gas discharge amount might be discharged.

Also, the other reason is as follows. The amount of the water generated by the electrical generation is small in the region of the small current value. Thus, the stored water amount calculated in step S21 might be larger than the actual stored water amount in the gas-liquid separator 12. Therefore, although the discharge of the water is completed in reality, it might be determined that the water is still being discharged, which might cause the timing of closing of the discharge valve 16 to be later than the original timing. As a result, the actual gas discharge amount might be larger than the target gas discharge amount.

In the above way, the ECU 20 in this system 1 estimates the gas discharge amount by the estimation method A having small errors in the region where the current value is smaller than the reference value, and by the estimation method B having small errors in the region where the current value is greater than the reference value. This suppresses the deterioration in the estimation accuracy of the discharge amount of the fuel gas in a large load region of the fuel cell 2.

Also, the estimation method B in the above embodiment detects the differential pressure ΔPb by use of the pressure sensor 22 that detects the pressure in the circulation passage 8, but the present invention is not limited to this. For example, instead of the pressure sensor 22, the detection value of the pressure sensor that detects the pressure in the supply passage 4, the gas-liquid separator 12, or the upstream side of the discharge valve 16 in the discharge passage 14 may be used.

Also, the differential pressure ΔPb is detected by the pressure sensor 23 that detects the pressure in the downstream side of the discharge valve 16 in the discharge passage 14, but the present invention is not limited to this. For example, instead of the pressure sensor 23, a pressure sensor arranged in a position other than the discharge passage 14 and in such a position as to detect atmospheric pressure may be used. The opening of the discharge valve 16 partially discharges the gas to the atmosphere, so such a pressure sensor can detect the pressure in the downstream side of the discharge valve 16.

In the above embodiment, the pressure decrease rate ΔP in the supply passage 4 is obtained based on the detection value from the pressure sensor 21, and the integrated fuel gas lost amount Q1 is calculated based on the pressure decrease rate ΔP, but the present invention is not limited to this. For example, the ECU 20 may obtain the pressure decrease rate in the circulation passage 8 based on the detection value from the pressure sensor 22 detecting the pressure in the circulation passage 8, and may calculate the integrated fuel gas lost amount Q1 based on the pressure decrease rate in the circulation passage 8. This is because the consumption of the fuel gas by the electrical generation of the fuel cell 2 decreases the pressure in the circulation passage 8, and the opening of the discharge valve 16 also decreases the pressure in the circulation passage 8. In this case, the pressure sensor 22 is an example of a pressure detecting portion that detects the pressure in the circulation passage 8. Additionally, the pressure sensor 22 may be provided on the upstream side of the gas-liquid separator 12 in the circulation passage 8 or on the downstream side of the gas-liquid separator 12 in the circulation passage 8.

Figure 12:
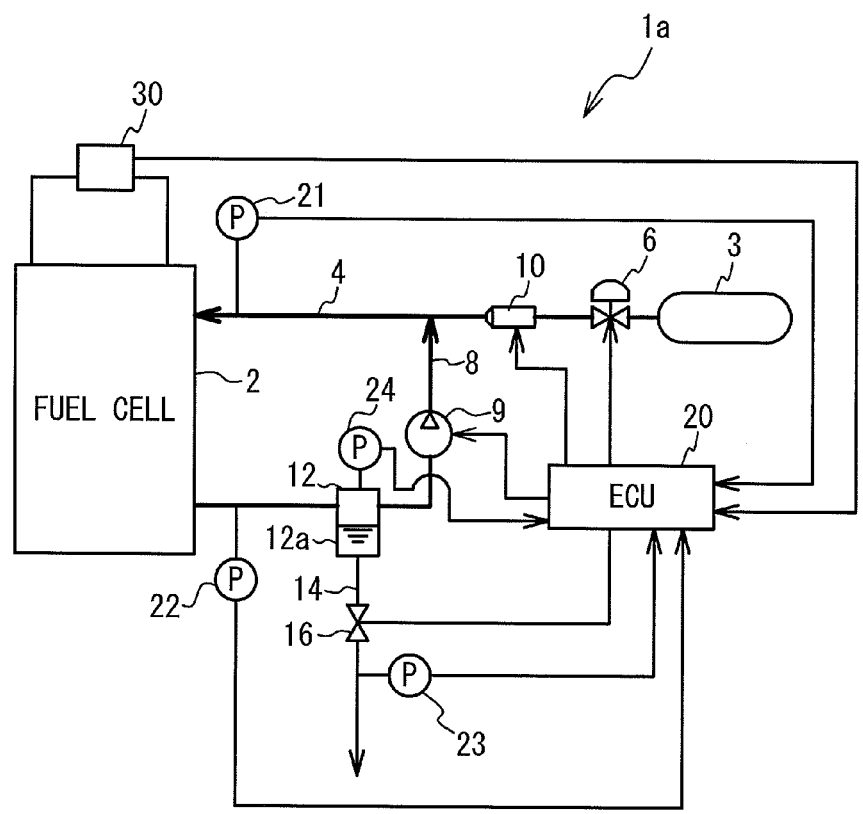
FIG. 12 is a schematic view of a fuel cell system according to a first variation.

Next, the system according to a variation will be described. FIG. 12 is a schematic view of the fuel cell system 1a according to a first variation. Additionally, components that are similar to those of the above system 1 will be denoted by the similar reference numerals, and a detailed description of such components will be omitted. The system 1a is provided with a pressure sensor 24 that detects the pressure in the gas-liquid separator 12. The pressure sensor 24 is provided at a high position so as not to be covered with the stored water in the gas-liquid separator 12. In the system 1a, the ECU 20 obtains the pressure decrease rate in the gas-liquid separator 12 based on the detection value from the pressure sensor 24, and calculates the integrated fuel gas lost amount Q1 based on the pressure decrease rate in the gas-liquid separator 12. This is because the consumption of the fuel gas by the electrical generation of the fuel cell 2 decreases the pressure in the gas-liquid separator 12 and the opening of the discharge valve 16 also decreases the pressure in the gas-liquid separator 12. In this case, the pressure sensor 24 is an example of a pressure detecting portion that detects the pressure in the gas-liquid separator 12.

Figure 13:
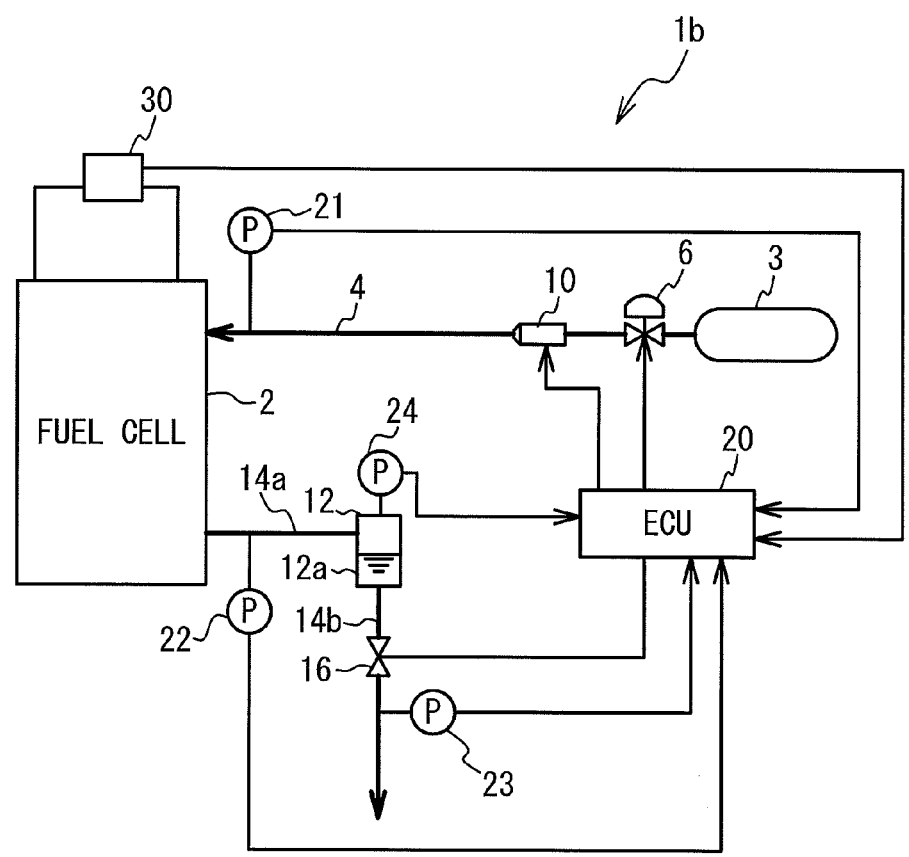
FIG. 13 is a schematic view of a fuel cell system according to a second variation.

FIG. 13 is a schematic view of a system 1b according to a second variation. The system 1b is an anode non-circulation type unlike the systems 1 and 1a, the circulation passage 8 or the circulation pump 9 is not provided, and the discharged fuel gas from the fuel cell 2 does not return to the supply passage 4 or the fuel cell 2 again. Also, the system 1b includes: a first discharge passage 14a that supplies the fuel gas discharged from the fuel cell 2 to the gas-liquid separator 12; and a second discharge passage 14b that is connected to the gas-liquid separator 12, partially discharges the fuel gas partially discharged from the fuel cell 2 to the outside, and discharges the stored water in the gas-liquid separator 12 to the outside. The discharge valve 16 is arranged in the second discharge passage 14b. Thus, the fuel gas partially discharged from the fuel cell 2 is partially discharged to the outside by opening the discharge valve 16. The pressure sensor 22 is provided in the first discharge passage 14a, and detects the pressure in the first discharge passage 14a. The pressure sensor 23 is provided in the second discharge passage 14b, and detects the pressure in the downstream side of the discharge valve 16 in the second discharge passage 14b.

Like the systems 1 and 1a, the system 1b can calculate the gas discharge amount Q, obtained by subtracting the integrated fuel gas consumed amount Q2 from the integrated fuel gas lost amount Q1, as the estimated gas discharge amount. Also, the ECU 20 may obtain the pressure decrease rate ΔP in the supply passage 4 based on the detection value from the pressure sensor 21 and may calculate the integrated fuel gas lost amount Q1 based on the pressure decrease rate ΔP, and may obtain the pressure decrease rate in the first discharge passage 14a based on the detection value from the pressure sensor 22 and may calculate the integrated fuel gas lost amount Q1. Also, the ECU 20 may obtain the pressure decrease rate in the gas-liquid separator 12 based on the detection value from the pressure sensor 24 that detects the pressure in the gas-liquid separator 12, and may calculate the integrated fuel gas lost amount Q1. The pressure sensors 21, 22, and 24 are examples of pressure detecting portions that detect the pressure in the supply passage 4, in the first discharge passage 14a, and in the gas-liquid separator 12, respectively.

In the system 1b, the ECU 20 detects the differential pressure ΔPb based on the detection value of the pressure sensor 22 that detects the pressure in the first discharge passage 14a, but the present invention is not limited to this. For example, the ECU 20 may detect the differential pressure ΔPb based on the detection value of the pressure sensor 21 detecting pressure in the supply passage 4, the detection value of the pressure sensor 24 that detects the pressure in the gas-liquid separator 12, or the detection value of a pressure sensor that detects the detection value of the pressure in the upstream side of the discharge valve 16 in the second discharge passage 14b.

Although some embodiments of the present invention have been described in detail, the present invention is not limited to the specific embodiments but may be varied or changed within the scope of the present invention as claimed.

What is claimed is:
1. A fuel cell system comprising:
   a fuel cell;
   a fuel supply source that supplies a fuel gas to the fuel cell;
   a supply passage through which the fuel gas supplied from the fuel supply source flows to the fuel cell;
   a circulation passage through which the fuel gas partially discharged from the fuel cell flows to the supply passage;

a gas-liquid separator that is arranged in the circulation passage and that stores and separates water from the fuel gas partially discharged from the fuel cell;
a discharge passage that is connected to the gas-liquid separator, discharges stored water in the gas-liquid separator to an outside, and partially discharges the fuel gas partially discharged from the fuel cell to the outside;
a discharge valve that is arranged in the discharge passage;
a current detecting sensor that detects a current value of the fuel cell;
a pressure detecting sensor that detects pressure in the supply passage;
a differential pressure detecting portion that detects a difference in pressure between a pressure on a downstream side of the discharge valve within the discharge passage and any one of a pressure within the supply passage, a pressure within the circulation passage, a pressure within the gas-liquid separator, and a pressure on an upstream side of the discharge valve within the discharge passage; and
a control unit that is programmed to estimate a discharge amount of the fuel gas partially discharged by opening the discharge valve,
wherein when the current value is not greater than a reference value, the control unit is programmed to estimate the discharge amount of the fuel gas based on a lost amount of the fuel gas being calculated from a decrease rate of pressure in the supply passage during an opening period of the discharge valve and a consumed amount of the fuel gas by electrical generation of the fuel cell being calculated from the current value during the opening period of the discharge valve, and
when the current value is greater than the reference value, the control unit is programmed to estimate the discharge amount of the fuel gas based on the difference in pressure between the pressure on the downstream side of the discharge valve within the discharge passage and the any one of the pressure within the supply passage, the pressure within the circulation passage, the pressure within the gas-liquid separator, and the pressure on the upstream side of the discharge valve within the discharge passage during the opening period of the discharge valve.

2. The fuel cell system of claim 1, wherein when the current value is not greater than the reference value, the control unit is programmed to estimate the discharge amount based on a value obtained by subtracting the consumed amount from the lost amount.

3. A fuel cell system comprising:
a fuel cell;
a fuel supply source that supplies a fuel gas to the fuel cell;
a supply passage through which the fuel gas supplied from the fuel supply source flows to the fuel cell;
a circulation passage through which the fuel gas partially discharged from the fuel cell flows to the supply passage;
a gas-liquid separator that is arranged in the circulation passage and that stores and separates water from the fuel gas partially discharged from the fuel cell;
a discharge passage that is connected to the gas-liquid separator, discharges stored water in the gas-liquid separator to an outside, and partially discharges the fuel gas partially discharged from the fuel cell to the outside;
a discharge valve that is arranged in the discharge passage;
a current detecting sensor that detects a current value of the fuel cell;
a pressure detecting sensor that detects pressure in one of the circulation passage and the gas-liquid separator;
a differential pressure detecting portion that detects a difference in pressure between a pressure on a downstream side of the discharge valve within the discharge passage and any one of a pressure within the supply passage, a pressure within the circulation passage, a pressure within the gas-liquid separator, and a pressure on an upstream side of the discharge valve within the discharge passage; and
a control unit that is programmed to estimate a discharge amount of the fuel gas partially discharged by opening the discharge valve,
wherein when the current value is not greater than a reference value, the control unit is programmed to estimate the discharge amount of the fuel gas based on a lost amount of the fuel gas being calculated from a decrease rate of pressure in either the circulation passage or the gas-liquid separator during an opening period of the discharge valve and a consumed amount of the fuel gas by electrical generation of the fuel cell being calculated from the current value during the opening period of the discharge valve, and
when the current value is greater than the reference value, the control unit is programmed to estimate the discharge amount of the fuel gas based on the difference in pressure between the pressure on the downstream side of the discharge valve within the discharge passage and the any one of the pressure within the supply passage, the pressure within the circulation passage, the pressure within the gas-liquid separator, and the pressure on the upstream side of the discharge valve in the discharge passage within the discharge passage during the opening period of the discharge valve.

4. A fuel cell system comprising:
a fuel cell;
a fuel supply source that supplies a fuel gas to the fuel cell;
a supply passage through which the fuel gas supplied from the fuel supply source flows to the fuel cell;
a gas-liquid separator that stores and separates water from the fuel gas partially discharged from the fuel cell;
a first discharge passage through which the fuel gas partially discharged from the fuel cell flows to the gas-liquid separator;
a second discharge passage that is connected to the gas-liquid separator, discharges stored water in the gas-liquid separator to an outside, and discharges the fuel gas partially discharged from the fuel cell to the outside;
a discharge valve that is arranged in the second discharge passage;
a current detecting sensor that detects a current value of the fuel cell;
a pressure detecting sensor that detects pressure in one of the supply passage, the first discharge passage, and the gas-liquid separator;
a differential pressure detecting portion that detects a difference in pressure between a pressure on a downstream side of the discharge valve and any one of a pressure within the supply passage, a pressure within the first discharge passage, a pressure within the gas-liquid separator, and a pressure on an upstream side of the discharge valve in the second discharge passage; and a control unit that is programmed to estimate a discharge amount of the fuel gas partially discharged by opening the discharge valve, wherein the fuel cell system is an anode non-circulation type in which the fuel gas partially discharged from the fuel cell does not return to the supply passage, when the current value is not greater than a reference value, the control unit is programmed to estimate the discharge amount of the fuel gas based on a lost amount of the fuel gas being calculated from a decrease rate of pressure in one of the supply passage, the first discharge passage, and the gas-liquid separator during an opening period of the discharge valve and a consumed amount of the fuel gas by electrical generation of the fuel cell being calculated from the current value during the opening period of the discharge valve, and when the current value is greater than the reference value, the control unit is programmed to estimate the discharge amount of the fuel gas based on the difference in pressure between a pressure on a downstream side of the discharge valve and any one of a pressure within the supply passage, a pressure within the first discharge passage, a pressure within the gas-liquid separator, and a pressure on an upstream side of the discharge valve in the second discharge passage during the opening period of the discharge valve.

\* \* \* \* \*